United States Patent
Hempelmann et al.

(10) Patent No.: US 6,846,510 B2
(45) Date of Patent: Jan. 25, 2005

(54) METHOD FOR DEPOSITION OF A CATALYST

(75) Inventors: Rolf Hempelmann, Ingbert (DE); Heinz Schmitz, Jülich (DE); March-Simon Löffler, Saarbrücken (DE); Harald Natter, Saarbrücken (DE); Jiri Divisek, Jülich (DE)

(73) Assignees: Forschungszentrum Julich GmbH, Julich (DE); Prof. Dr. Rolf Hempelmann, Ingbert (DE)

(*) Notice: Subject to any disclaimer, the term of this patent is extended or adjusted under 35 U.S.C. 154(b) by 0 days.

(21) Appl. No.: 10/432,981

(22) PCT Filed: Nov. 28, 2001

(86) PCT No.: PCT/DE01/04522

§ 371 (c)(1),
(2), (4) Date: Jun. 1, 2003

(87) PCT Pub. No.: WO02/45195

PCT Pub. Date: Jun. 6, 2002

(65) Prior Publication Data

US 2004/0037951 A1 Feb. 26, 2004

(30) Foreign Application Priority Data

Dec. 1, 2000 (DE) .......................... 100 59 743

(51) Int. Cl.[7] .............................................. B05D 5/12
(52) U.S. Cl. ....................................... 427/115; 501/101
(58) Field of Search ................................. 501/101, 185; 427/115, 337, 343

(56) References Cited

U.S. PATENT DOCUMENTS

| | | | | |
|---|---|---|---|---|
| 3,296,102 A | | 1/1967 | Worsham et al. | |
| 4,186,110 A | * | 1/1980 | Jalan et al. | 502/101 |
| 4,407,905 A | * | 10/1983 | Takeuchi et al. | 429/42 |
| 5,767,036 A | * | 6/1998 | Freund et al. | 502/185 |
| 6,277,261 B1 | | 8/2001 | Divisek et al. | |

FOREIGN PATENT DOCUMENTS

| | | |
|---|---|---|
| JP | 01307445 | 12/1989 |
| WO | WO 99/13128 | 3/1999 |

OTHER PUBLICATIONS

New Preparation Technique and Characterisation . . . by Löffler et al. (Scripta mater. 44(2001).
"Ein Neues Verfahren Zur Kupferätzung . . . " by W. Faul et al. (Galvanotechnik No. 9, vol. 65(1974).
"Active Carbon" by Bansai et al. (New York, 1988).

* cited by examiner

Primary Examiner—Brian K. Talbot
(74) Attorney, Agent, or Firm—Herbert Dubno

(57) ABSTRACT

The invention relates to a method for deposition of a catalyst, in particular a method for coating a membrane electrode unit (MEA) for a fuel cell. Said method requires no external electrical field as usual for conventional galvanic techniques. The support for the catalytic layer is first capacitively charged (pseudocapacitance). When brought into contact with an electrolyte solution, comprising the catalyst in the form of dissolved metal salt ions, an in-situ reduction (deposition) of the metal salt ions to give metallic catalyst occurs at the site of contact.

5 Claims, 3 Drawing Sheets

METHOD FOR DEPOSITION OF A CATALYST

CROSS REFERENCE TO RELATED APPLICATIONS

This application is the US national phase of PCT application PCT/DE01/04522 filed 28 Nov. 2001 and is based upon German national application 10059743.2 of 1 Dec. 2000 under the International Convention.

TECHNICAL FIELD

The invention relates to a method for the deposition of a catalyst, especially for depositing a catalyst as a coating of a membrane-electrode unit of a fuel cell.

STATE OF THE ART

The central element of a fuel cell is the membrane-electrode unit (MEA) which is assembled from a sandwich-like arrangement of layers of electrode-membrane-electrode. For fuel cells with an operating temperature range of 0 to 150° C., ion conducting solid electrolyte membranes on a polymer basis are used. The anodes for hydrogen oxidation and the cathodes for oxygen reduction are primarily coated with platinum and the anode for the methanol oxidation of the direct methanol fuel cell (DMFC) is, by way of example, coated with platinum-ruthenium.

The principle of a fuel cell is known from the publication "K. Kordesch, G. Simander: *Fuel Cells and their Applications*, VCH Weinheim, 1996". In this publication additional and different methods for making the membrane electrode unit (MEA) for a fuel cell are described. The catalytically active layer is then located at the phase boundary between the gas diffusion layer (backing layer) and the polymer electrolyte.

The application of the catalyst can be typically effected in two ways. On the one hand, the electrode can, by application of a thin platinum layer or a platinum catalyst supported on a carbon carrier, be applied to the diffusion layer of a gas diffusion electrode (*J. Power Sources* 22, J. *Electrochem. Soc.* 135 (1988) 2209, Electrochimica Acta 38 (1993) 1661). On the other hand, the catalyst layer can be applied to the membrane as was first described for example in U.S. Pat. No. 3,297,484. A detailed description of different coating processes can be found in the publication "*Advances In Electrochemical Science and Technology*, Volume 5, R. C. Alkire, editor, Wiley-VCH Verlag, Weinheim, 1997".

The carbon supported noble metal catalysts are as a rule obtained by chemical reduction of a salt on the carbon surfaces. Infrequently, powders which are commercially available can also be used as unsupported catalysts.

The catalyst layers fabricated by these methods usually have relatively large amounts of the noble metal in the catalyst coating. Especially in the case of DMFC, there is a high catalyst utilization so that the entire process may be uneconomical. From U.S. Pat. No. 5,084,144 and the publication "E. J. Taylor et al., Journal of the Electrochemical Society, Vol. 139 (1992) L45–46", an electrochemical coating process has been made known for producing gas diffusion electrodes with the goal of achieving an especially low platinum coating with high platinum utilization. This is achieved automatically by the electrochemical coating method since the metal seeds there only deposit if an electrochemically active three phase boundary is present. According to this method, for the production of a thin catalytically active layer, an electrolytic deposition of a catalyst metal from a galvanic bath is carried out in which the catalyst layer forms the cathode for the deposition. The drawback is that with this method noble-metal containing electrode baths are required which are expensive and cost-intensive to process. Furthermore, the utilization of the noble metal dissolved in the electroplating bath is very limited so that the advantages of optimal deposition must be considered in the context, for example, of the rinsing processes.

To avoid the disadvantages, DE 197 20 688 C1 proposes a process in which the noble metal salts dissolved in the Nafion solution is applied as a precursor layer between the diffusion layer of the electrode and the electrolyte layer and then the noble metal is electrochemically deposited between the electron conductor and the electrolyte in the active three-phase zone. Advantageously with this method, no expensive galvanic bath is required. The method is carried out as has been described in detail in DE 197 20 688 C1.

All of the aforedescribed methods are in principle galvanotechnical or electroplating processes. They have the common characteristic that they require an external electrical current circuit with an applied voltage in which, by the transformation of an electric current flow (galvanostatic method) or of the voltage (potentiostatic method) to an electrochemical deposition processes as is usual in galvano-technology. As a result of this direct electromechanical deposition which is usually cathodic, the metal catalyst is locally deposited from a salt electrochemically and can be effective at this location. Simultaneously the anodic reaction takes place at a counter-electrode.

From the publication "Ein neues Verfahren zur Kupfer ätzung bei der Lelterplattenheratellung, Galvanotechnk Nr. 9, Band 65 (1974), S. 2–10", ("A New Method for Copper Etching in Printed Circuit Board Production, Galvano Technology, No. 9, Volume 65 (1974), pages 2–10), an alternative method has become known which delivers the electric current indirectly by means of the stored charge on the carbon surface. Graphite and especially active carbon have on their surfaces numerous active groups which have reducing or oxidizing properties in the electrochemical sense and in addition can have a strongly absorptive effect (R. Ch. Bansal, J.-B. Donnet, P. Stoeckli, ACTIVE CARBON, Marcel Dekker, N.Y., 1988). This characteristic is used in the indirect method. At an auxiliary anode, a graphite suspension is oxidized to the so-called "graphite compound" for which the empirical formula $C^+{}_n HSO^-{}_4$ can be given. This can be oxidatively effective as well as capable of adsorbing inorganic acids as can be deduced from the formula given. With a stored charge of 3 As/G, n=2700. Since the printed circuit board has an electrically insulating subplate, it cannot be directly electrically contacted. Thus the graphite suspension is transported with the electrolyte flow to the copper printed circuit board which is oxidized by contact to copper ions. An electrical contact is made "by the solution". The overall process is thus described by the following equations:

Auxiliary electrode: $Gr \rightarrow Gr^{2n+} + 2n\ e^-$
Cathode: $n\ Cu^{2+} + 2n\ e^- \rightarrow n\ Cu$
Workpiece $Gr^{2n+} + n\ Cu \rightarrow Gr + Cu^{2+}$

OBJECT OF THE INVENTION

The object of the invention is to provide a simple method for depositing a catalyst, especially a noble metal catalyst which can be carried out without the direct application of an external voltage.

SUBJECT OF THE INVENTION

Within the framework of the invention it has been found that a carbon carrier is suitable for carrying a pseudocapacitive charge.

The pseudocapacitive of the carbon carrier is present when it is capable in the electrochemical sense of being effective for oxidation and/or reduction.

The active groups on the surface of a carbon carrier are capable of storing an electrical charge. Especially, for example, graphite or active carbon on a auxiliary electrode can take up electrons and itself be available in a reduced form. At other locations the graphite or active carbon can then give off is electrons to another system (for example $Pt/Pt^{2+}$) and be themselves oxidized whereby the other system is thereby reduced. Thus it has been found for example that the reduced form of the active carbon Vulcan XC72 at a pH value of 7.73 has a redox potential of 337 mV against a standard hydrogen electrode (SHE). This value is 183 mV more negative than the corresponding potential of the redox pair $Pt/Pt^{2+}$ so that the Vulcan carbon, as a consequence of the pseudocapacitive effect, can reduce platinum from a solution.

The method according to the invention for depositing a catalyst material thus involves the step of reducing with a carbon carrier an ionic catalyst precursor. By a carbon carrier is to be understood a material which is used as a carrier material and is based upon carbon. To the class of such carriers belong especially coals and graphite, especially active coals and powder or granular forms of carbon or carbon blacks.

The catalytically active layer of a fuel cell typically contains a carbon carrier, especially active carbons. It has been found, within the scope of the invention, that several types of carbon, which are suitable as carrier materials, permit the cathodic reduction of a water soluble or Nafion soluble noble metal salt directly into the active layer. At manufacture, the carbon carrier, for example, the active carbon, is brought in an appropriate manner to a potential which can cause the reduction of the metallic salt solution. The precursor layer of a fuel cell electrode is then prepared from this carbon. The precursor is then in an appropriate process (for example, spraying, screen printing and painting) applied to the membrane. This precursor layer contains active carbon which lies in contact with the Nafion distributed in the layer. These contact locations are potentially active three phase boundaries. If then a Nafion solution of a noble metal salt is supplied to the electrode (preferably a noble metal salt like for example a platinum salt or a noble metal mixed salt like for example a platinum/ruthenium salt) it is distributed along Nafion paths and the noble metal is deposited electrochemically directly in situ at the three-phase boundaries with the active carbon. The pseudocapacitance stored in the carbon ($C_n$ for carbon carriers generally or Gr for graphite) is discharged.

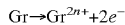

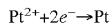

The reaction products which result by analogy with the previously described "graphite compounds" include adsorbate of the inorganic acid with the carbon in accordance with the empirical reaction formula:

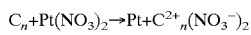

The resulting nitric acid is flushed out in the start up of fuel cell operations like the other water soluble auxiliaries, for example glycerin.

An advantageous embodiment of the method utilizes carbon black as the active carbon as an especially appropriate carbon carrier.

A further advantageous refinement of the method provides the carbon carrier in the form of a precursor layer. In this manner, the MEA (membrane-electrode unit) can have a wider scope in terms of material and the deposition of the metallic catalyst can occur directly at the three-phase zones.

Especially advantageously the ionic metal catalyst can be supplied to the carbon carrier according to claim 4 in the form of an electrolyte solution.

The aforedescribed method is suitable especially for the production of membrane-electrode units for fuel cells. No external electric field is required for the deposition of the catalyst. Furthermore, no electrical contacts are necessary. The pseudocapacitive charge can be achieved already during the manufacturing process of the carbon carrier so that the subsequent catalyst deposition can be effected completely independently from a voltage supply. Advantageously the deposition also takes place at the three-phase interface.

BRIEF DESCRIPTION OF THE DRAWING

The above and other objects, features, and advantages will become more readily apparent from the following description, reference being made to the accompanying drawing in which.

(a) without catalyst layer, (b) with catalyst layer produced by galvanic deposition, (c) with catalyst layer made by the capacitive deposition according to the invention.

SPECIFIC DESCRIPTION

Vulcan XC-72 is treated with a Nafion solution, mixed and sprayed on two Teflon foils (Nafion content: 30%). The layers were dried and pressed at 130° C. on a Nafion membrane in a double-sided manner. Then the Teflon foils were drawn off. On the remaining carbon layers, a mixture of platinum nitrate with Nafion was painted and then dried. The precursor sample was found to contain:

| Vulcan XC-72: | each | 4 mg/cm² |
| Platinum: | each | 1 mg/cm² |
| Nafion: | each | 8 mg/cm² |

Figure 1:
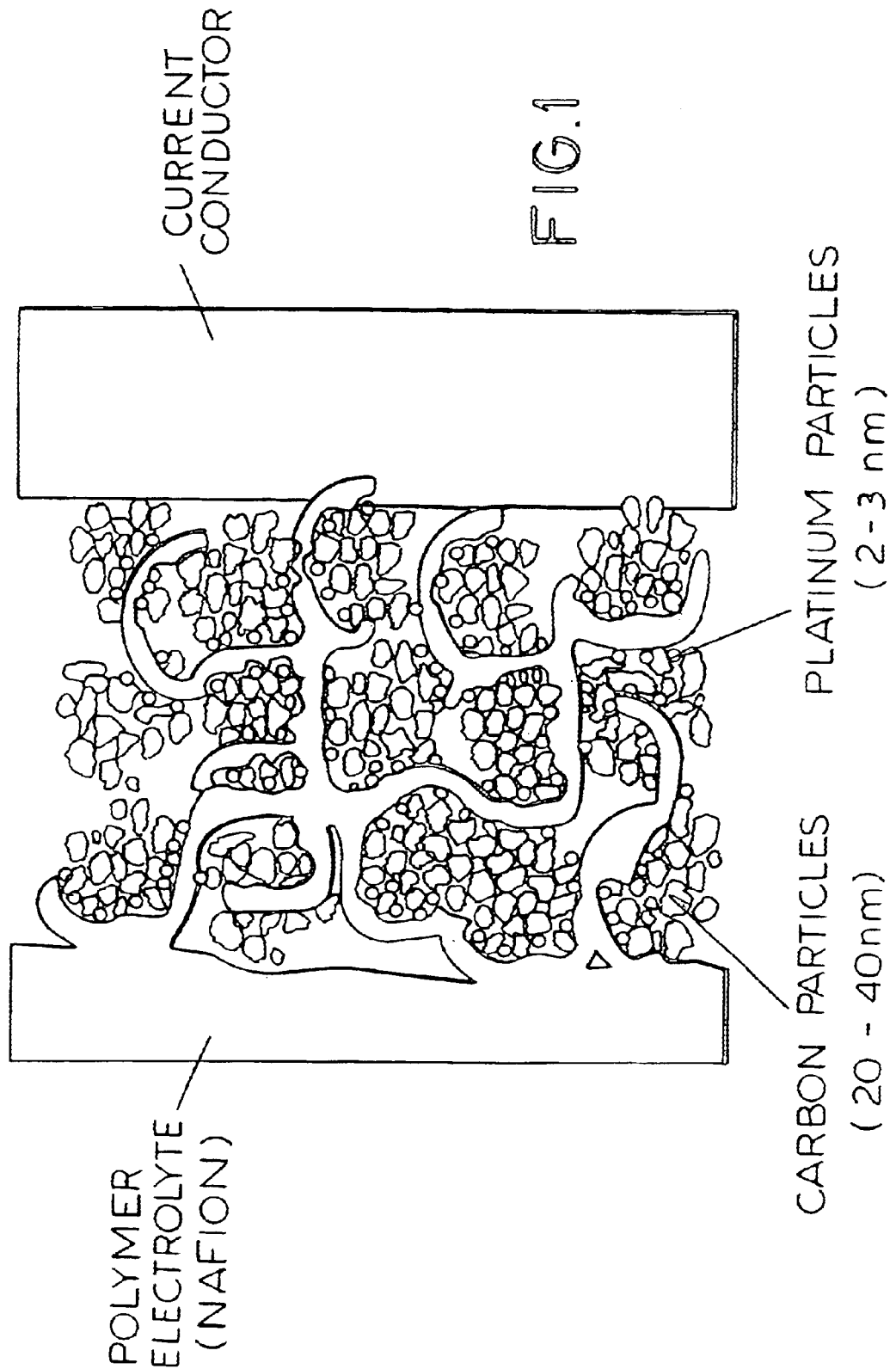
FIG. 1: A schematic illustration of MEA (membrane-electrode unit of a fuel cell with the membrane, the precursor layer encompassing carbon particles and different precipitated platinum particles, as well as the gas diffusion layer).
Figure 2:
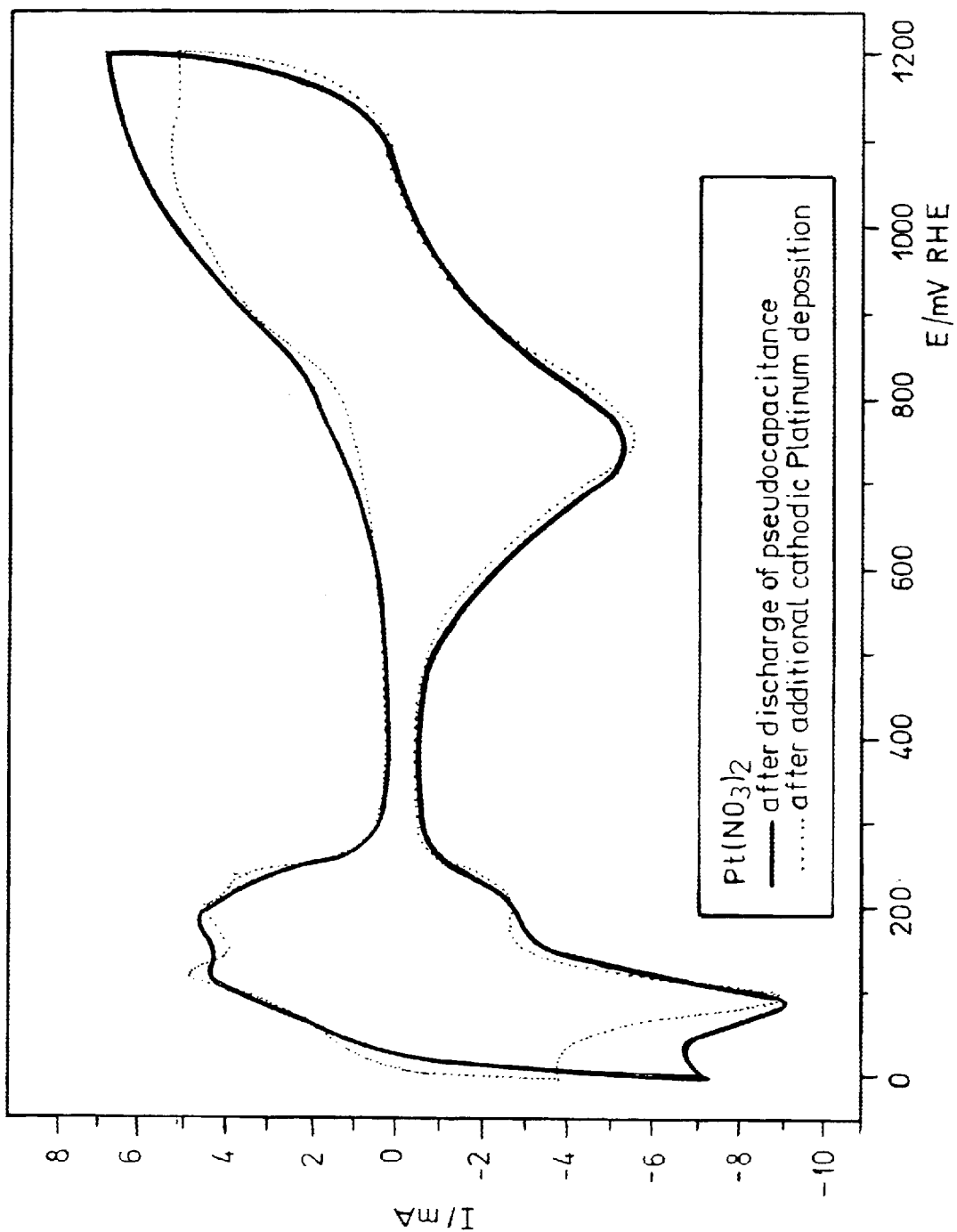
FIG. 2: A cyclical voltogram (current versus potential) measured the reversible hydrogen electrode—RHE) for the platinum to be deposited in the precursor layer from the Pt $(NO_3)_2$ as the ionic compound. The current/time integral of the hydrogen adsorption between 0 and 300 mV is characteristic for the in situ formation of the platinum catalyst.

As a result of the discharge of the carbon nanocrystalline platinum was formed which was suitable as a catalyst for the fuel cell. The electrochemical activity was determined by the hydrogen storage capacity in the hydrogen potential range (FIG. 2: cyclical voltogram). This Figure shows that the electrochemical activity was comparable with that of an electrochemically deposited platinum coating.

The membrane coated on opposite sides with platinum was pressed between two diffusion layers (backing layers) so that the precursor layers each had a side turned toward a respective diffusion layer. In this manner MEAs (membrane-electrode units) could be produced for fuel cells which were advantageously suitable for fuel cell operations.

Figure 3:
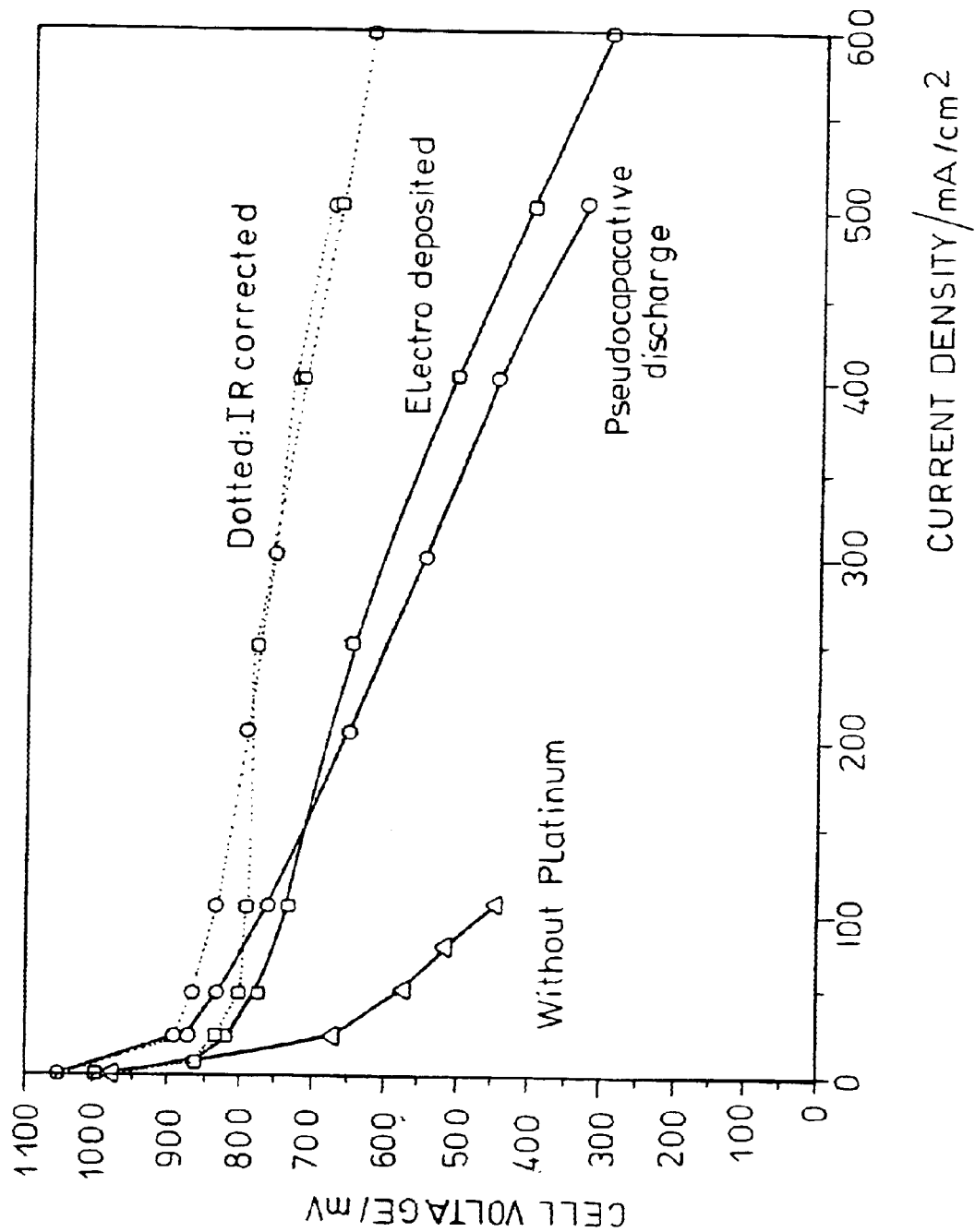
FIG. 3: Graphs of the cell voltage versus current density for a fuel cell.

The function of the MEA produced in accordance with the method of the invention in a fuel cell is shown in FIG. 3. The IR-corrected curve of the function as a fuel cell shows also that the output capacity was much better than without platinum coating and comparable to that with an electrochemically deposited platinum coating. By IR-corrected curve it is to be understood that the cell voltage is treated as if all detrimental ohmic potential drops are eliminated. The thus corrected cell voltage is generally a criterium for the electrochemical activity of the electrodes.

What is claimed is:

1. A method of applying a fuel-cell catalyst to a fuel-cell electrode, comprising the steps of:

providing carbon in a layer on a fuel-cell electrode;

providing an ionic fuel-cell catalyst precursor in said layer; and reducing said ionic fuel-cell catalyst precursor to a fuel-cell catalyst solely with the carbon in said layer, thereby applying said fuel-cell catalyst to said fuel-cell electrode.

2. A method of applying a fuel-cell catalyst to a fuel-cell electrode, comprising the steps of:

applying a carbon carrier to a fuel-cell electrode in a layer;

adding an ionic fuel-cell catalyst precursor to said carbon carrier whereby said ionic fuel-cell catalyst precursor is located in said layer; and reducing said ionic fuel-cell catalyst precursor to a fuel-cell catalyst solely with the carbon in said layer, thereby applying said fuel-cell catalyst to said fuel-cell electrode.

3. The method defined in claim 2 wherein carbon black or active carbon is provided as said carbon carrier.

4. The method defined in claim 2 wherein the carbon carrier is applied to said electrode in the form of an electrolyte solution.

5. The method defined in claim 2, further comprising the step of assembling said electrode with a membrane to form a membrane electrode unit for a fuel cell.

* * * * *